United States Patent
Robinson

(10) Patent No.: US 9,151,958 B2
(45) Date of Patent: Oct. 6, 2015

(54) DISPLAY SYSTEM USING A PAIR OF POLARIZED SOURCES WITH A 3-D DISPLAY MODE AND TWO 2-D DISPLAY MODES

(75) Inventor: Ian S. Robinson, Redondo Beach, CA (US)

(73) Assignee: Raytheon Company, Waltham, MA (US)

(*) Notice: Subject to any disclaimer, the term of this patent is extended or adjusted under 35 U.S.C. 154(b) by 562 days.

(21) Appl. No.: 12/874,695

(22) Filed: Sep. 2, 2010

(65) Prior Publication Data
US 2012/0057133 A1 Mar. 8, 2012

(51) Int. Cl.
| | | |
|---|---|---|
| G03G 21/00 | (2006.01) | |
| G02B 27/26 | (2006.01) | |
| G03B 35/26 | (2006.01) | |
| H04N 13/04 | (2006.01) | |
| G02F 1/1335 | (2006.01) | |

(52) U.S. Cl.
CPC ............. *G02B 27/26* (2013.01); *G03B 35/26* (2013.01); *H04N 13/0434* (2013.01); *H04N 13/0459* (2013.01); *G02F 1/13362* (2013.01); *G02F 2203/12* (2013.01)

(58) Field of Classification Search
CPC ...... G02B 27/26; G02B 27/28; G02B 27/286; G02B 27/283; G02B 27/285; G02B 27/22; G02B 5/30; G02B 5/3008; G02B 5/3025; G02B 35/26; H04N 13/0434; H04N 13/0436; H04N 13/0059; H04N 13/1497; H04N 13/0459; G02F 2203/12; G02F 1/13362; G03B 35/26

USPC .......... 353/8, 7, 20, 10, 6; 359/465, 464, 466, 359/462, 242, 238; 349/15, 13, 5, 8, 9, 96, 349/97; 348/51, 52, 58, 54; 250/208.1, 225, 250/216

See application file for complete search history.

(56) References Cited

U.S. PATENT DOCUMENTS

| | | | | |
|---|---|---|---|---|
| 5,821,989 A | * | 10/1998 | Lazzaro et al. ................. | 348/56 |
| 6,229,648 B1 | * | 5/2001 | Barak ...................... | 359/487.04 |
| 6,943,949 B2 | * | 9/2005 | Sedlmayr ................ | 359/487.04 |

(Continued)

OTHER PUBLICATIONS

McAllister, D. F., "Display Technology: Stereo & 3D Display Technologies" (Feb. 2002).

(Continued)

*Primary Examiner* — Que T Le
*Assistant Examiner* — Jennifer Bennett
(74) *Attorney, Agent, or Firm* — Schwegman Lundberg & Woessner, P.A.

(57) ABSTRACT

A display system includes a driver configured to create command signals for generating a pair of images along two different optical paths; a pair of polarized sources, each polarized source configured to produce a polarized image of one of the pair of images along a respective optical path at substantially the same time based on a command signal from the driver, the first of the pair of polarizer sources configured to produce a different polarization than the second of the pair of polarizer sources; a polarization co-alignment element configured to optically align the polarized images from the respective polarizer along a common optical path; and a display screen configured to display the co-aligned polarized images. Depending on the mode of the display system, 3-D polarized glasses may be worn by the viewers for observing the displayed images.

15 Claims, 3 Drawing Sheets

(56) References Cited

U.S. PATENT DOCUMENTS

| | | | |
|---|---|---|---|
| 7,016,040 | B2 | 3/2006 | Chen et al. |
| 7,301,700 | B2 | 11/2007 | Momoki et al. |
| 7,690,794 | B2 * | 4/2010 | Boothroyd ............... 353/20 |
| 7,926,949 | B1 * | 4/2011 | Boothroyd ............... 353/8 |
| 8,134,109 | B2 * | 3/2012 | Tang ............... 250/208.1 |
| 2002/0196199 | A1 * | 12/2002 | Weitbruch et al. ........ 345/6 |
| 2005/0254113 | A1 * | 11/2005 | Cirkel et al. ............ 359/259 |
| 2006/0268407 | A1 * | 11/2006 | Fergason et al. ......... 359/487 |

OTHER PUBLICATIONS

CVI Optical Components and Assemblies catalogue, "Polarizing Beamsplitter Cubes", © 2007 CVI Laser LLC, p. 251.

Alabaster, J., "Big Japanese brands readying 3-D flat-screen TVs", (1 page)(Oct. 6, 2009).

In Focus® DepthQ® Stereoscopic Video Projector by LightSpeed Design, "The In Focus® DepthQ® 3D Video Projector: Q&A Paper", pp. 1-9 (May 4, 2008).

* cited by examiner

DISPLAY SYSTEM USING A PAIR OF POLARIZED SOURCES WITH A 3-D DISPLAY MODE AND TWO 2-D DISPLAY MODES

BACKGROUND

This application generally relates to display devices, and in particular, to three dimensional (3-D) polarized displays.

3-D displays have been used for a variety of applications, such as, for example, image analysis, video gaming, computer-aided design (CAD), and movies. Previously, stereoscopes were used to present two different images to a viewer's eyes.

There are a multitude of 3-D displays on the market that use a range of technologies. These include single graphical displays that use special shading and sizing of objects to mimic a 3-D effect. As such, the single-display versions are only approximations of true 3-D and do not contain full-spatial detail.

Other conventional 3-D displays include dual displays in which unique information is sent to each eye of the observer. For example, 3-D movie systems use two separate projectors that are synchronized. IMAX 3D®, for instance, has developed a dual-film camera with single optics that operates at 48 frames per second (time interleaved). The IMAX Corporation, InFocus Corporation and Lightspeed Design, Inc. each produce digital projectors based on the time-interleaved technique. The IMAX® projector operates at extreme brightness for very large movie screens. The Lightspeed Design DepthQ® projector, on the other hand, is portable and is aimed primarily at the gaming and CAD markets.

Dual displays require the use of specialized glasses or goggles that are configured to split the images into respective ones for each eye. Dual displays generally have low brightness and low resolution. For example, conventional dual displays may use red/blue separation, two full-sized polarized displays, time-interleaved displays, and spatially interlaced polarimetric displays. Of these options, the time-interleaved variant is most prevalent, appearing in many commercial products. The viewer wears goggles which apply active shutters to select information synchronously for each eye. This type of display operates at double its needed speed (i.e., at 120 Hz), alternating images sent to each eye on sequential frames, which is burdensome on the projectors.

Thus, in light of the aforementioned drawbacks, an improved 3-D display is desired.

SUMMARY

In one embodiment, a display system comprises a driver configured to create command signals for generating a pair of images along two different optical paths; a pair of polarized sources, each polarized source configured to produce a polarized image of one of the pair of images along a respective optical path at substantially the same time based on a command signal from the driver, the first of the pair of polarizer sources configured to produce a different polarization than the second of the pair of polarizer sources; a polarization co-alignment element configured to optically align the polarized images from the respective polarizer along a common optical path; and a display screen configured to display the co-aligned polarized images.

In another embodiment, a display system comprises at least one pair of polarized glasses, the glasses each comprising a pair of polarizing display elements, each polarized display element is configured to produce a polarized image of one of the pair of images along a respective optical path for each eye of a viewer at substantially the same time based on a command signal from an image driving processor.

One or more embodiments disclosed herein may be used as a theater system. The theater system may be configured as a public theater, similar to a typical "movie theater," for instance, having one large display screen and/or seating for many viewers. The display systems are configured to generate images. Depending on the mode of the display system, 3-D passive polarized glasses may be worn by the viewers for observing the displayed images.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the invention. In addition, it should be appreciated that structural features shown or described in any one embodiment herein can be used in other embodiments as well.

DETAILED DESCRIPTION

In one or more embodiments, a display system generally includes a driver configured to create command signals for generating a pair of images along two different optical paths; a pair of polarized sources, each polarized source configured to produce a polarized image of one of the pair of images along a respective optical path at substantially the same time based on a command signal from the driver, the first of the pair of polarizer sources configured to produce a different polarization than the second of the pair of polarizer sources; a polarization co-alignment element configured to optically align the polarized images from the respective polarizer along a common optical path; and a display screen configured to display the co-aligned polarized images.

The display systems provide, among other things, compactness, increased brightness (or utilization of reduced power) compared to conventional 3-D displays, minimum frame resolution and frame rates (e.g., 30 Hz), full-spatial resolution and geometry, and may enable the use of passive polarized glasses—rather than active glasses—for viewers to observe 3-D imagery.

These display systems may be used to display image data, for instance, from various sensor systems that produce 3-D imagery and movies, including 3-D flash laser radar (ladar), synthetic aperture ladar, and (passive) stereo or multi-view imagery. Images may be still images, video, or both. These systems may be beneficial for developers of three-dimensional imagery of scenes, using ladar sensors and passive sensors collecting two (stereo) or more sets of imagery offset in angle. The disclosed system, can display this information efficiently and in portable displays for field use.

The 3-D display systems may also operate in a 2-D mode which can produce a fully-redundant, two-dimensional (2-D) display that can be viewed without the aid of glasses, having an increased brightness, full-resolution display. In 2-D mode, the brightness may be up to double (2×) the brightness of conventional 2-D display systems. These may be used with conventional 2-D imagery and video.

One or more embodiments disclosed herein may be used as a theater system. The theater system may be configured, for instance, as a public theater, similar to a typical "movie theater," having seating for many viewers. Depending on the particular embodiment, the theater may (or may not) have a large central display screen. Alternatively or additionally, the theater system may also be configured as a "home theater," for a smaller more personal audience. For instance, the display systems may be used for high-brightness projectors for 3-D movies, especially digital projectors, and commercial 3-D television displays. Depending on the mode of the display system, 2-D or 3-D, glasses may be worn by the viewers for observing the displayed images.

Figure 1:
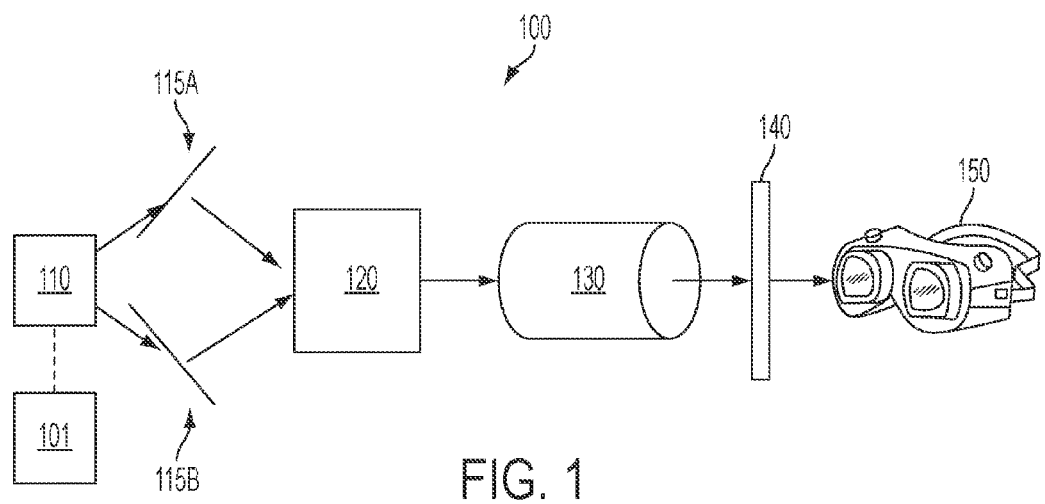
FIG. 1 shows a schematic of a 3-D polarization display system, in accordance with an embodiment.

FIG. 1 shows a schematic of 3-D polarization display system 100, in accordance with an embodiment.

Display system 100 generally includes image content source(s) 101, driver 110, a pair of polarized sources 115A, 115B, polarization co-alignment element 120, projection optics 130 and display screen 140. In particular, display system 100 is configured to project and co-align two bright and full-resolution polarized images onto display screen 140. Displayed images may be switched at a minimal frame rate for video images, such as, for example, 30 frames per second (fps) or Hz. Although, frame rates can also be higher, such as, for example, 60 fps. Images generated by display system 100 may be observed by one or more viewers each wearing a pair of glasses 150 and/or with the naked eye in some instances (e.g., in 2-D mode), depending on the mode or operation.

Driver 110 may be an image driving processor that is configured to create command signals for generating a pair of images along two different optical paths via polarized sources 115A, 115B at substantially the same time. In some instances, driver 110 may be configured to generate, retrieve image content from image content source(s) 101, or both. Command signals to the polarized sources 115A, 115B may be electrical signals, optical (light) signals, electromagnetic signals, or the like, which include instructions, image data, and/or other data transmitted to polarized sources 115A, 115B for generating said images. Analog and digital signals are both possible. Various signal protocols may used, and none should be construed as limiting. In addition, wired and/or wireless communications may be used.

One or more image content sources 101 of image, video data, or both may be connected to driver 110. For instance, image content sources 101 may include a still camera or video camera, a digital video disk (DVD) player, video cassette recorder/player (VCR), wireless broadcast ("over-air") television signals, satellite transmission signals, cable television signals, Internet transmitted signals, and/or other image and/or video sources. The frame rate for video may be, for example, 30 or 60 Hz. Content sources 101 and driver 110 may be connected by wired connections, wireless connection, or both.

In a 3-D mode, these pairs of images can either be a "stereoscopic" or "autostereoscopic." Stereoscopic images include two separate 2-D images, one sent to each eye, which the human mind mentally "processes" as 3-D. On the other hand, for "autostereoscopic" images, the same 2-D image is sent to each eye although some image processing (i.e., shading and other graphical techniques) of the image is performed before being actually viewed. The human mind mentally processes these processed image as a 3-D-like appearance. In a 2-D mode, the pair of images may be identical.

Next, two polarized images, having different polarizations, are created from the command signals for generating a pair of images output from driver 110 using two polarized sources 115A, 115B, respectively. First polarized source 115A is positioned in one of the two optical paths and second polarized source 115B is positioned in the other of the optical paths. In one implementation, polarized sources 115A, 115B may be configured to generate orthogonal polarizations, such as s- and p- or right- and left-circularly polarization. The two polarized images are generated by polarized sources 115A, 115B in a substantially simultaneous manner.

One polarized source that may be used for each of polarized sources 115A, 115B is a liquid crystal display (LCD). The LCD display may have an image resolution of 1 million or more pixels. For most LCDs, the exiting light is inherently polarized. Of course, other polarized sources are also possible, such as, a spatial array of laser diodes or polarized light emitting diodes (LEDs). As noted above, driver 110 creates command signals for generating the spatial representations of the pair of images, while polarized sources 115A, 115B generate the optical polarized images based on the command signals.

The polarized images generated by polarized sources 115A, 115B are then transmitted to polarization co-alignment element 120 that is configured to optically align the two polarized images into a single optical projection. Co-alignment element 120 may be, for instance, an achromatic polarizing beam splitter (APBS). While conventional alignment devices, such as thin film polarizing beam splitters and half-silvered mirror beam splitters, might also be used, they unfortunately are not that efficient, and may lose approximately 50% of the energy. An achromatic polarizing beam splitter, on the other hand, only loses only about 5%, thus being much more efficient. The co-aligned image is magnified by projection optics 130 and projected onto display screen 140. Projections optics 130 may include one or more lens elements, such as an objection lens.

Display screen 140 may be a back-lit or a front-lit display screen, as known in the art, such as conventional movie screens. These may include matte white, pearlescent, silver, or glass bead. Moreover, display screen 140 may be configured as a flat, horizontal-curve, or torex screen, as known in the art. These configurations may be convenient for theaters which may accommodate large audiences.

Alternatively, display system 100 including display screen 140 may be configured as a unitary structure, similar to a projection television set, in which the projection elements are located behind the screen. This may be convenient for smaller home theater systems. In other embodiments, a "heads-up" display unit may also be used for display screen 140. This may be more practical for mobile installations, such as, automobiles, motorcycles, airplanes, boats, etc, in which images can be displayed, for instance, on a windshield or other window element.

In some instances, for example, a back-lit screen may be used for a small image (e.g., less than 42 inches), and a front-lit screen may be used for projecting a larger image (e.g., greater than 42 inches). Viewers can observe the image, in 3-D, by using passive glasses 150 that transmit separate polarizations to each eye to provide the viewer with a stereoscopic or auto stereoscopic 3-D effect.

Glasses 150 may be, for instance, conventional passive polarized glasses or goggles. In general one eye lens is configured to filter light of a single polarization. These may include passive polarized glasses having lens with s- and p- or right- or left-circularly polarization of the right and left lens elements of a pair of glasses 150. Glasses 150 may also include a nose bridge and a head strap (shown), or alternatively temples, so to be comfortably worn by the viewer, as typically found on eyeglasses.

Figure 2:
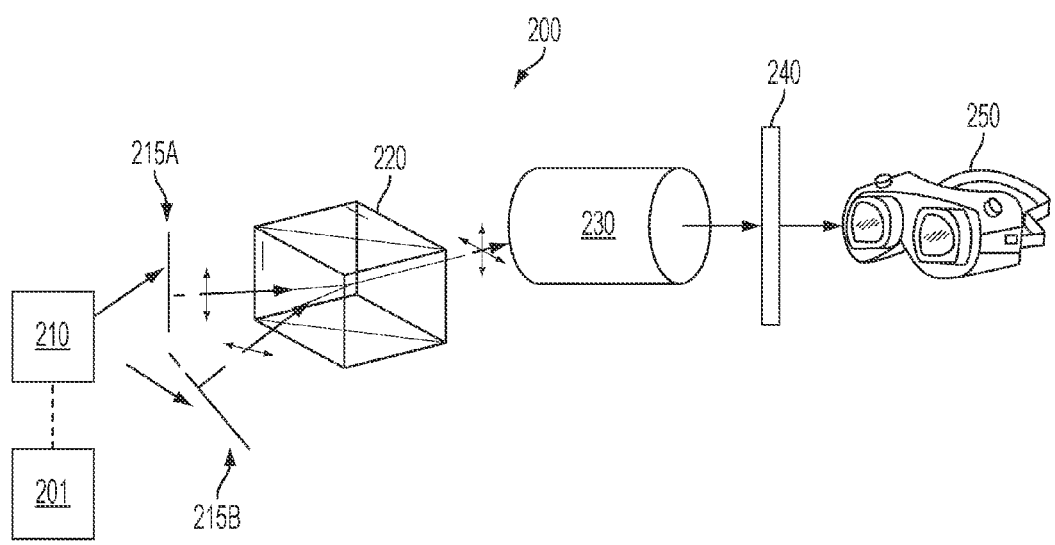
FIG. 2 shows a schematic of a 3-D polarization display having an achromatic polarizing beam splitter, in accordance with an embodiment.

FIG. 2 shows a schematic of 3-D polarization display 200 having an achromatic polarizing beam splitter in accordance with an embodiment.

Generally, display system 200 includes image content source(s) 201, driver 210, polarized sources 215A, 215B, polarization co-alignment element 220, projection optics 230 and display screen 240. Images generated by system 200 may be observed by one or more viewers wearing glasses 250 and/or with the naked eye in some instances (e.g., in 2-D mode).

Display system 200 may be configured to operate both as a 3-D display mode and in a 2-D display, as discussed above. In 2-D mode, system 200 may operate to make a single image display redundant and/or higher brightness.

In some instances, image content source(s) 201, driver 210, polarized sources 215A, 215B, projection optics 230, display screen 240 and glasses 250 may be substantially identical to their counter-parts in system 100 (FIG. 1). In display system 200, polarization co-alignment element 220 may be a Wollaston prism optionally combined with a second polarizing prism and/or a polarizing grating, as described in U.S. Pat. No. 7,016,040, herein incorporated by reference in its entirety. Image quality requirements and system size/complexity for a particular implementation, may determine whether the optional elements (such as a prism or grating) are included.

Polarization co-alignment element 220 has very little energy loss compared to traditional beam splitters (e.g. a half-silvered mirror) that might also be used to optically align two images, but which lose a significant percentage, for instance over 50%, of their optical power. In addition, traditional beam splitters require the images to be transmitted at right angles, which may not be efficient for packaging. On the other hand, when a Wollaston prism is used for polarization co-alignment element 220, the orthogonal polarizations diverge from the co-aligned ray at very small angles (e.g., less than about 20 degrees), thus enabling a more compact package to be employed. Polarization co-alignment element 220 combines the two polarized images very efficiently. As such, this embodiment can be used in other modes that obviate the need for viewers to wear glasses 250.

In a first 2-D mode, polarizer source 215A can be used as the primary display and polarizer sources 215B used as a redundant or duplicate backup source (or vice-versa). Thus, if one polarizer source 215A or 215B were to fail, the other can still be used. The viewer can manually select to switch displays (with one or more buttons or similar element) or an automated controller (not shown). The viewer or controller can switch the sources so as to engage a second display when a first display is inoperative.

Similarly, in a second 2-D mode, driver 210 projects the same image to both polarizer sources 215A, 215B. The result is an increased brightness two-dimensional display that can be viewed in higher ambient lighting. For example, the brightness may be up to double (2x) that of a conventional display. The redundant and increased bright modes can be options along with the 3-D display. This option may not be readily realized using a traditional beam splitter, such as a half-silvered mirror beam splitter. In addition, this configuration provide redundancy, if one of the image paths is temporarily inoperative.

In one implementation, two very small LCDs can be employed as polarized sources 215A, 215B. These may be, for example, micro-sized LCDs of 1 inch or less.

Figure 3:
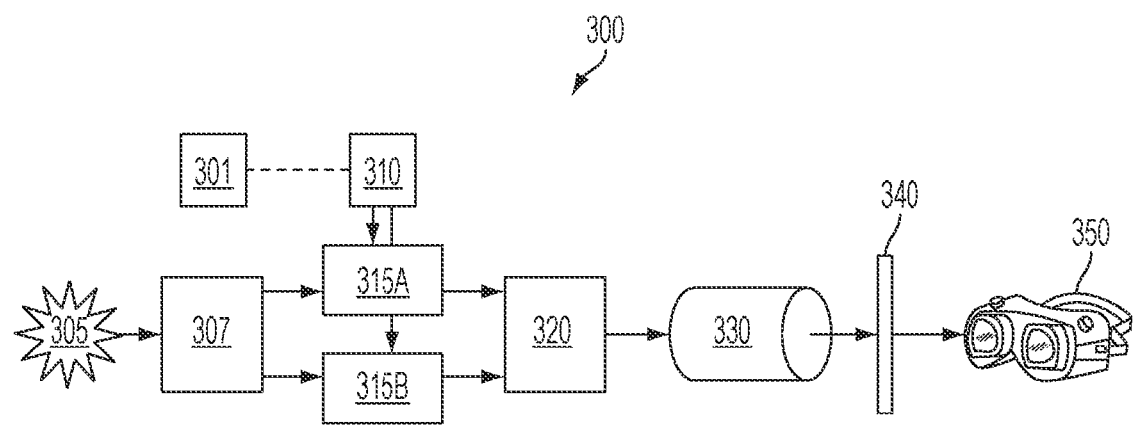
FIG. 3 shows a schematic of a 3-D polarization display system having two polarization alignment devices, in accordance with an embodiment.

FIG. 3 shows a schematic of 3-D polarization display system 300 having two polarization alignment devices in accordance with an embodiment.

Generally, display system 300 includes image content source(s) 301, unpolarized light source 305, beam splitter 307, driver 310, polarizer sources 315A, 315B, polarization co-alignment element 320, projection optics 330, and display screen 340. Images generated by system 300 may be observed by one or more viewers wearing glasses 350 or with the naked eye in some instances (e.g., in 2-D mode).

In some instances, image content source 301, driver 310, projection optics 330, display screen 340, and glasses 350 may be substantially identical to their counter-parts in system 100 (FIG. 1).

As shown, unpolarized light source 305 illuminates polarization beam splitter 307 to create two different polarized light sources in two different optical paths. Beam splitter 307 may be, for example, an APBS. The two light sources produced by beam splitter 307 may, for instance, have orthogonal polarizations.

Driver 310 is configured to create command signals for generating a pair of images along two different optical paths. Spatial light modulators 315A, 315B each configured to generate a polarized image of one of the pair of images along two along a respective optical path based on a command signal from driver 310.

Polarized light exiting beam splitter 307 illuminates spatial light modulators 315A, 315B, each positioned in one of the two optical paths, to create the two different polarized images of the images generated by driver 310. The two polarized images are generated by spatial light modulators 315A, 315B in a substantially simultaneous manner. These polarized images may, for instance, have orthogonal polarizations. Spatial light modulators 315A, 315B may be, for example, epitaxial film, digital mirror devices, or liquid crystal displays. If spatial modulators 315A, 315B are film, then driver 310 may be configured to physically move the film reel, to create the images. Otherwise, spatial modulators 315A, 315B may impart a spatially varying texture to the illuminated radiance. The two (modulated) images are then input to polarization co-alignment element 320 and projection optics 330 to screen display 340 similar to as in system 100 (FIG. 1). Glasses 350, similar to glasses 150 (FIG. 1), may enable viewers to observe the displayed images on display screen 340.

In one implementation, two APBSs can be utilized, with one used as polarization beam splitter 307 and the other used as co-alignment element 320. These APBSs may be identical, if desired.

Figure 4:
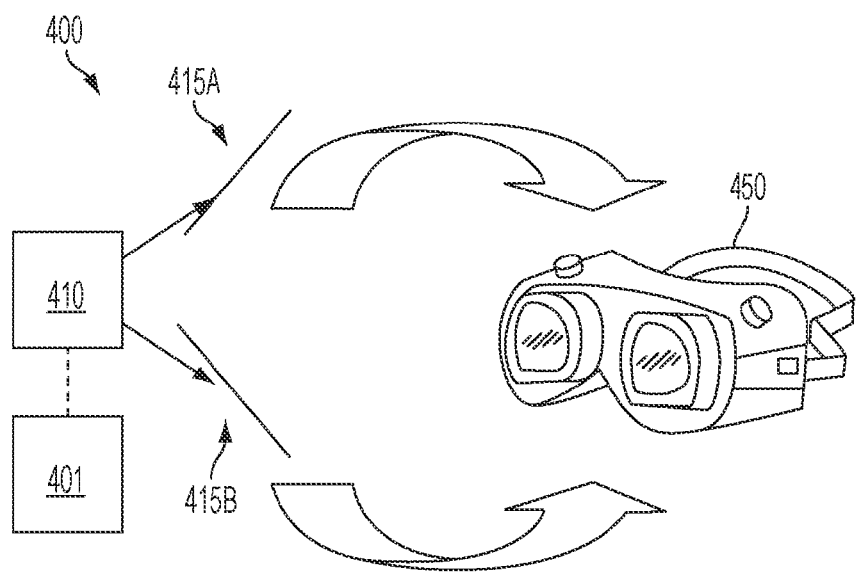
FIG. 4 shows a schematic of a 3-D polarization display system having polarized glasses with display elements incorporated therein, in accordance with an embodiment.

FIG. 4 shows a schematic of 3-D polarization display system 400 having polarized glasses which include polarized display elements incorporated therein, in accordance with an embodiment.

Display system 400 generally includes image content source(s) 401, driver 410 and one or more pairs of glasses 450 (although only one pair is shown) each including a pair of polarizing display elements 415A, 415B. Driver 410 connected to image content source(s) 401 may transmit a pair of images to glasses 450. Image content source(s) 401 may be similar to its counter-parts in display system 100 (FIG. 1). In a 3-D mode, these pairs of images are stereoscopic or autostereoscopic images that are configured to provide a 3-D stereoscopic or autostereoscopic effect when observed by a viewer. In a 2-D mode, the pair of images may be identical. Each pair of glasses 450 includes two optical paths, one for each eye, that are configured to enable observing of the images generated by driver 410 by a single viewer. Glasses 450 may be considered passive.

The images generated by driver 410 may be transmitted to glasses 450, for example, using wired connection, wireless connection, or both. For instance, glasses 450 may include an antenna and/or transmitter/receiver for communication with driver 410, and transmitting image data.

Corresponding images are created for the image data generated by driver 410 using polarizing display elements 415A, 415B, respectively, positioned within glasses 450. For instance, first display element 415A is positioned in one of the two optical paths and second display element 415B is positioned in the other of the optical paths in glasses 450. The two polarized images are generated by polarizing display elements 415A, 415B in a substantially simultaneous manner.

Glasses 450 provide privacy to the viewer(s). Without such glasses 450, the images cannot be scene by others (without the aid of glasses 450). No other display device (such as, for instance, separate display screen 140) may be necessary.

Polarizing display elements 415A, 415B may each include a small display device, for instance, having more than 1 million pixels and spanning less than one-half inch. Display elements may provide color, pseudo-color or monochrome display depending on particular applications. In other implementations, a plurality of display devices may be abutted together to make a larger display element for each of polarizing display elements 415A, 415B. In this embodiment, glasses 450 do not require any additional polarized optics for the viewer to observe the displayed images.

Figure 5:
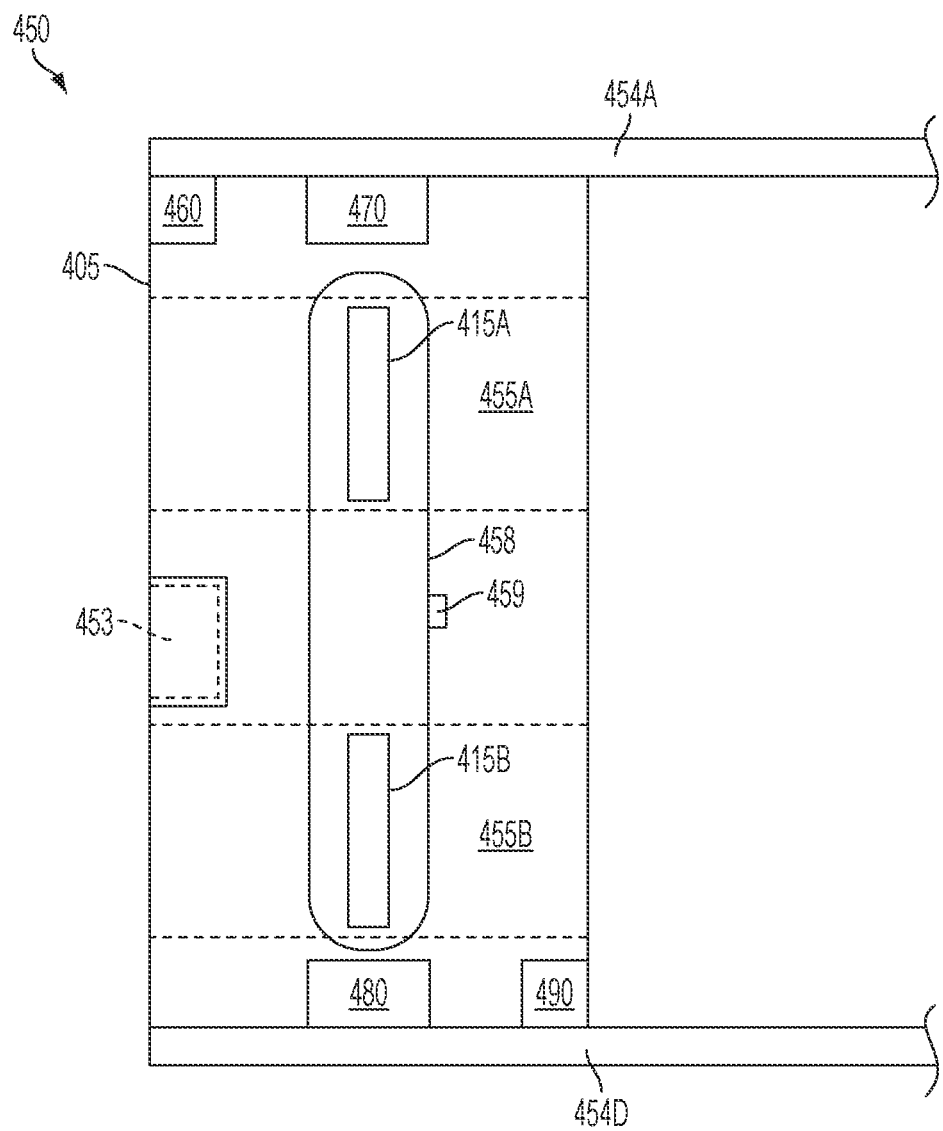
FIG. 5 shows a top plan view of a schematic for an exemplary pair of polarized glasses which may be used with the display shown in FIG. 4, in accordance with an embodiment.

FIG. 5 shows a top plan view of a schematic for passive polarized glasses 450 for use in display system 400 in accordance with an embodiment. Glasses 450 may include housing 405 that integrates the various elements thereof, and enables glasses 450 to be comfortably worn by the viewer, as typically found on eyeglasses. Nose bridge 453 and head strap or temples 454A, 454B are provided to support glasses 450 on the viewer's head. Each of the optical paths 455A, 455B of glasses 450 is for observing directly by each eye of the viewer wearing that pair of glasses 450.

The images generated by driver 410 may be transmitted to glasses 450, for example, using wired connection, wireless connection, or both. For instance, glasses 450 may include an antenna 460 and/or transmitter/receiver 470 for communication with driver 410, and transmitting image data, for instance. Data transmission may be analog or digital, for instance, in a packetized form, as typically used for transmissions between networked devices.

In some instances, display element 415A, 415B may be of a modular construction that is configured to be removably and releaseably mounted within glasses 450, with little or no effort, by the viewer. For instance, the modular display elements 415A, 415B may be slid, individually or together, into one or more cavities 458 in glasses 450 and maintained in place with a locking mechanism 459, such as spring-biased pawl, set-screw, etc.

Glasses 450 may include a power supply 480 providing power to display elements 415A, 415B, and other electrical components. For instance, AC or DC voltage supplied by a conventional power supply via a plug may be used as power supply 480. In some instances, a battery pack may additionally or alternatively be used for power supply 480.

In some embodiments, images generated by driver 410 may be in the infrared (IR) or the ultraviolet (UV) spectra and not visible to the naked eye. These spectra may be converted for display using display element 415A, 415B using an image processor 490, into the visible (VIS) spectra for observation via the glasses 450. For instance, glasses 450 can be configured to convert the received light, which is generally not ordinarily observable by a viewer, to a monochrome or colored (or pseudo-color display) for the viewer to observe.

In other embodiments, glasses 450 may also be used for low (visible) lighting conditions to provide night vision capability. This may include amplification and/or spectral conversion using image processor 490 similar to algorithms used in conventional night vision systems. Sources of image content supplied to driver 410 may also include cameras, sensors and/or detector devices which are configured to detect light in non-visible spectra and/or low ambient lighting conditions. In some instances, image content source(s) 401, driver 410 and glasses 450 may be integrated together into a binoculars unit or user-wearable unit.

While the term "glasses" is used herein, it will be appreciated that glasses 150, 250, 350, and 450 may be configured as eyeglasses, goggles, spectacles, eyepieces, eyecups, and/or other optical elements having two optical paths, one for each eye of the wearer, in keeping within the scope of this disclosure.

Conventional 3-D image data may include "temporally interleaved" images (e.g., spaced apart at ½ of frame time). When viewed, the human brain does not recognize or appreciate the temporal offset spacing, but instead mentally processes the images to generate a 3-D image. However, this conventional image data runs at least twice as fast as typically necessary for video (e.g., at 120 Hz). By contrast, the embodiments disclosure herein need not rely on temporally interleaved image data. For instance, the image data may sent to each eye in a substantially simultaneous manner. Thus, the display (including polarized sources) may run much more slowly and thus may requires less energy.

In some implementations, the driver or other image processing elements may be configured to process and convert conventional 120 Hz temporally interleaved image data (frame set) into substantially simultaneous image data at a lower frame rate (e.g., 30 or 60 Hz) for display using more or more embodiments described herein. For instance, a buffer (e.g., a memory or register) may capture and hold a (first) image frame and wait ½ a frame time, to release the (first) capture image along with a (second) image frame, at say 60 Hz. Additional buffering may be used reduce the frame rate even slower, for instance, to 30 Hz.

The driver and image processor may include hardware, such as Application Specific Integrated Circuits (ASICs), Field Programmable Gate Arrays (FPGAs), digital signal processors (DSPs), or other integrated formats. However, those skilled in the art will recognize that the driver and the image processor may, in whole or in part, be equivalently implemented in integrated circuits, as one or more computer programs having computer-executable instructions or code running on one or more computers (e.g., as one or more programs running on one or more computer systems), as one or more programs running on one or more processors (e.g., as one or more programs running on one or more microprocessors), as firmware, or as any combination thereof, and that designing the circuitry and/or writing the code for the software and/or firmware would be well within the skill of one skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of computer-readable medium used to carry out the distribution.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A display system comprising:
    a driver configured to create command signals for generating a pair of images along two different optical paths;
    a pair of polarized light-emitting elements, each polarized light-emitting element configured to produce a polarized image of one of the pair of images along a respective optical path at substantially the same time based on a command signal from the driver, the first of the pair of polarized light-emitting elements configured to produce a different polarization than the second of the pair of polarized light-emitting elements;
    an achromatic polarizing beam splitter (APBS) comprising a Wollaston prism and configured to optically align the polarized images from the respective polarizer along a common optical path; and
    a display screen configured to display the co-aligned polarized images;
    wherein the driver is switchable among a 3-D display mode, a first 2-D display mode, and a second 2-D display mode;
    wherein in the 3-D display mode, the driver configures the command signals so that the first and second polarized light-emitting elements produce stereoscopic or autostereoscopic images;
    wherein in the first 2-D display mode, the first polarized light-emitting element provides a primary display, and the second polarized light-emitting element provides a backup display configured to activate if the primary display fails; and
    wherein the second 2-D display mode, the driver configures the command signals so that the first and second polarized light-emitting elements simultaneously produce the same images, the aligned images being brighter than each polarized image before alignment.

2. The system according to claim 1, wherein the co-aligned polarized images generated on the display screen are observable to a viewer wearing passive polarized glasses.

3. The system according to claim 2, wherein the co-aligned polarized images generated on the display screen are not observable by a viewer with the naked eye, and the glasses convert the image to an observable image.

4. The system according to claim 1, wherein the co-aligned polarized images generated on the display screen are observable to a viewer without the aid of polarized glasses.

5. The system according to claim 1, wherein each polarized light-emitting element includes a respective liquid crystal display (LCD) device.

6. The system according to claim 1, wherein the APBS further comprises at least one of a second polarizing prism and a polarizing grating to operate in combination with the Wollaston prism.

7. The system according to claim 1, further comprising:
    projection optics positioned between the polarized light-emitting elements and the display screen and configured to magnify the co-aligned polarized images displayed on the display screen.

8. The system according to claim 1, wherein the display screen is one of a back-lit, front-lit, or heads-up display.

9. The system according to claim 1, wherein the driver is configured to convert temporally interleaved image data to the pair of images.

10. The system according to claim 1, wherein the pair of polarized light-emitting elements has a frame rate of 30 or 60 Hz.

11. The system according to claim 1, further comprising:
    one or more passive polarized glasses that are configured to enable one or more viewers to observe images generated by the display system.

12. The system of claim 1,
    wherein the system is configurable to operate in at least one of a two-dimensional (2D) mode and a three-dimensional (3D) mode,
    wherein when operating in the 3D mode, the pair of images generated by the driver arestereoscopic or autostereoscopic images and the co-aligned polarized images on the display screen are observable with passive polarized glasses, the stereoscopic images being different 2D images, the autostereoscopic images being identical with different image processing, and
    wherein when operating in the 2D mode, the pair of images generated by the driver are the identical and the co-aligned polarized images on the display screen are observable without polarized glasses.

13. The system of claim 12 wherein the APBS comprises at least one of a second polarizing prism and a polarizing grating in combination with a Wollaston prism.

14. The system according to claim 1, wherein each polarized light-emitting element includes a respective spatial array of laser diodes.

15. The system according to claim 1, wherein each polarized light-emitting element includes a respective spatial array of polarized light emitting diodes (LEDs).

* * * * *